United States Patent
Cairncross et al.

[15] 3,700,693
[45] Oct. 24, 1972

[54] FLUOROORGANOCOPPER COMPOUNDS, COMPLEXES AND SOLUTIONS THEREOF FOR COPPER-COATING SUBSTRATES

[72] Inventors: Allan Cairncross; William Arthur Sheppart, both of Wilmington, Del.

[73] Assignee: E. I. du Pont de Nemours and Company, Wilmington, Del.

[22] Filed: Dec. 2, 1970

[21] Appl. No.: 102,569

Related U.S. Application Data

[63] Continuation-in-part of Ser. No. 725,541, May 30, 1968, abandoned, which is a continuation-in-part of Ser. No. 557,605, June 15, 1966, abandoned.

[52] U.S. Cl. ........260/340.6, 117/107.2, 117/138.8, 117/160, 260/438.1
[51] Int. Cl. .........................C07d 15/00, C07f 1/08
[58] Field of Search..................................260/438.1

[56] References Cited

OTHER PUBLICATIONS

Chemcial Abstracts, Vol. 45, 8966b (1951).
Chemcial Abstracts, Vol. 44, 4411c (1950).
Coates, Organometallic Compounds, John Wiley & Sons, N.Y. pp. 348– 349 (1960).
Chemical Abstracts, Vol. 47, 6858g (1953).
Chemical Abstracts, Vol. 51, 12840a (1957).

*Primary Examiner*—Tobias E. Levow
*Assistant Examiner*—H. M. S. Sneed
*Attorney*—James A. Costello

[57] ABSTRACT

Described and claimed are fluoroorganocopper compounds prepared preferably by the metathetical reaction of a fluoroorganometallic compound with a copper-containing compound. These are highly soluble in inert organic solvents and have a greater thermal stability compared to nonfluorinated organocopper compounds. Complexes are formed by interaction of fluororganocopper compounds with dioxane. Fluoroorganocopper compounds are useful for the preparation of finely divided copper metal and for copper-coating various substrates.

8 Claims, No Drawings

FLUOROORGANOCOPPER COMPOUNDS, COMPLEXES AND SOLUTIONS THEREOF FOR COPPER-COATING SUBSTRATES

CROSS-REFERENCE TO RELATED APPLICATIONS

This application is a continuation-in-part of copending application Ser. No. 725,541, filed Apr. 30, 1968, which is a continuation-in-part of copending application Ser. No. 557,605, filed June 15, 1966, both now abandoned.

SUMMARY OF THE INVENTION

This invention is directed to (1) fluoroorganocopper compounds having an atomic ratio of fluorine to copper of at least 1 (2) their complexes, (3) solutions thereof in aprotic solvents, and (4) a process for copper coating substrates and particular coated substrates.

The fluoroorganocopper compounds and complexes of this invention having an atomic ratio of fluorine to copper of at least 1:1 are of the formula

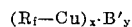

wherein $R_f$ is a fluorinated monovalent hydrocarbyl radical containing up to 12 carbons selected from the group consisting of

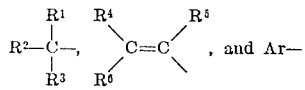

wherein $R^1$ and $R^2$ can be the same or different and are selected from the group consisting of hydrogen, perfluoroalkyl, fluoroaryl and (perfluoroalkyl)aryl; $R^3$ is a group selected from the group consisting of hydrogen, perfluoroalkyl, fluoroaryl, (perfluoroalkoxy)aryl and carbalkoxy; $R^4$, $F^5$ and $R^6$ can be the same or different and are fluoroalkyl; Ar is selected from the group consisting of fluoroaryl, (fluoroalkyl)aryl, and (perfluoroalkoxy)aryl; B' is dioxane; $x$ is an integer from 1—4 and $y$ is 0, ½, 1, 2 or 3.

The process for preparing the above-described fluoroorganocopper compounds comprises reacting a fluoro compound, $R_fQ$ wherein $R_f$ is as described above and Q is chlorine, bromine, iodine, M or MX where M is a metal selected from the group consisting of atomic number 3, 11–13, 19, 20, 30, 31, 37, 38, 48, 49, 55, 56 and 82, and X is chlorine, bromine or iodine with a copper-containing compound including cuprous bromide, cuprous chloride, cuprous iodide, cuprous thiocyanate, and $[R_f\text{-Cu}]_x \cdot B'_y$ in an inert anhydrous, aprotic solvent.

The process for coating a substrate with copper metal comprises contacting the surface of a substrate with a fluoroorganocopper compound of this invention or a solution thereof in an organic solvent at a temperature in the range 0°–350° C.

The compounds of this invention are useful for copper-coating substrates such as for coating copper on a textile fiber of for the production of a printed circuit, and for the preparation of finely divided copper metal.

DESCRIPTION OF THE PREFERRED EMBODIMENTS

The fluoroorganocopper compounds of this invention contain at least one atom of combined fluorine per atom of copper. This quantity of fluorine and copper is expressed as an atomic ratio of fluorine to copper of at least 1:1. Preferably the fluoroorganocopper compounds have an atomic ratio of fluorine to copper of 3:1 or higher. For example, pentafluorophenylcopper has a fluorine-to-copper ratio of 5:1.

The complexes of this invention comprise the reaction product of a fluoroorganocopper compound and 1,4-dioxane.

The fluoroorganocopper compounds of this invention generally are soluble in inert aprotic solvents such as ethyl ether, di-n-butyl ether, diphenyl ether, hexene, benzene, toluene, pentene, cyclohexene and mixtures of these solvents. The solubility of fluoroorganocopper compounds in these solvents is an unexpected and unique property. Nonfluorinated organocopper compounds are generally insoluble in these solvents. Solutions of the fluoroorganocopper compounds constitute a product embodiment of this invention. The fluoroorganocopper compounds like other organocoppers are easily hydrolyzed. Solvents used for preparation of solutions are preferably anhydrous.

In general, the fluorinated organocopper compounds of this invention have excellent thermal stability compared to nonfluorinated organocopper compounds. This greater thermal stability is an unexpected and unique property. The greater stability is shown by pentafluorophenylcopper which undergoes no decomposition when heated at 130° C. for 5.5 hours whereas phenylcopper, obtained by the reaction of cuprous iodide and phenyl magnesium iodide, decomposes at room temperature in 36 hours. H. Gilman and R. C. Straley, Trav. Chim., 55, 821 (1936).

Fluoroorganocopper compounds of this invention are produced by the metathetical reaction of a fluoroorganometallic compound with a copper-containing compound. Fluoroorganometallic intermediates used in this process are prepared by the reaction of a fluoroorganic halide with a metal selected from the groups: IA, IIA and IIIA of the Periodic Table of Elements as set forth in Deming's "General Chemistry," John Wiley and Sons, Inc., New York, 5th Edition, Chapter 11, zinc, lead, cadmium and mixtures of these metals. Included among these metals are: lithium, sodium, potassium, rubidium, cesium, francium, magnesium, calcium, strontium, barium, boron and aluminum. Preferably, the metal used has an atomic number of 3, 11—13, 19, 20, 30, 48, and 82.

The fluorinated organic halides used for the preparation of fluorinated organometallic intermediates are of the formulas

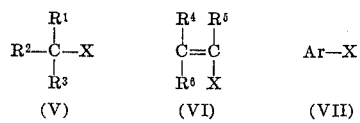

wherein X is selected from chlorine, bromine and iodine and $R^1$, $R^2$, $R^3$, $R^4$, $R^5$, $R^6$, and Ar are as defined above.

Copper-containing compounds which are reacted with a fluoroorganometallic compound to produce the products of this invention include cuprous bromide, cuprous chloride, cuprous iodide, cuprous oxide, cuprous thiocyanate and the like.

The process is conducted in an anhydrous, inert, aprotic solvent such as ether, tetrahydrofuran and 1,2-dimethoxyethane. The process comprises the preparation of the fluoroorganometallic intermediate by the reaction of the desired metal and the fluoroorganic halide in an anhydrous, inert, aprotic solvent at temperatures of −80 to +100° C., followed by addition of the copper-containing compound with stirring. Oxygen is preferably excluded from the reaction mixture, therefore the reaction is conducted under nitrogen, argon or other inert gas.

In general, the metathetical reaction of a fluoroorganometallic compound with a copper-containing compound requires 10 to 60 minutes for completion. In some cases, the reaction requires shorter or longer reaction times. The reaction is conducted at a temperature of −80 to 100° C. Pressure is not critical and both subatmospheric and superatmospheric pressure can be used. Preferably, the reaction is conducted at atmospheric pressure.

Magnesium is the preferred metal for the preparation of the fluoroorganometallic intermediate (as the fluoroorganomagnesium halide solution). The addition of a copper-containing compound to this intermediate in the presence of a solvent, such as diethyl ether, produces a solution containing the fluoroorganocopper compound, fluoroorganomagnesium halide and magnesium halide. It is critical that magnesium be removed from the solution. 1,4-Dioxane, when added to this mixture forms insoluble 1,4-dioxane-magnesium halide complexes which can be removed from the fluoroorganocopper-containing solution by filtration or decantation. The quantity of dioxane added is the amount which is capable of complexing all the magnesium present in the reaction mixture. It is preferable to add a slight excess of 1,4-dioxane over the amount required to form the complex. 1,4-Dioxane treatment produces fluoroorganocopper solutions of high purity. By high purity it is meant that the fluoroorganocopper solution produced is free of metallic reactant other than copper.

The preparation of pure fluoroorganocopper compounds using metals other than magnesium can be accomplished by selection of an inert aprotic reaction medium in which the metallic intermediate by-product is insoluble and the fluoroorganocopper compound is soluble. The reaction medium can consist of a single inert aprotic solvent or a mixture of an inert, aprotic solvent and an inert, aprotic nonsolvent such as hexane or cyclohexane.

Alternatively, essentially pure fluoroorganocopper compounds can be prepared by evaporating the above-described reaction mixtures to dryness and selectively extracting the fluoroorganocopper compound from this crude product using an inert, aprotic solvent or a mixture of an inert, aprotic nonsolvent, such as hexane. Organocopper compounds contaminated with organic by-products can be purified by evaporating the mixture to dryness followed by extraction with a nonsolvent such as hexane. By the latter process, organic materials such as coupled by-products can be selectively extracted from the fluoroorganocopper compound.

The process includes an organocopper-fluoroorganic halide interchange process whereby an organocoppper compound is reacted with a fluoroorganic halide to produce a fluoroorganocopper. Preferably a fluoroorganocopper compound ($R_f''Cu$) is reacted with a fluoroorganic halide, ($R_f'''X$) to produce a different fluoroorganocopper compound $R_f'''Cu$ and a different fluoroorganic halide ($R_f''X$). This process is conducted at temperatures of −80 to 100° C. Pressure is not critical in this process and atmospheric, subatmospheric and superatmospheric pressures can be used. Preferably, the process is conducted at atmospheric or near atmospheric pressure under an inert gas sparge to exclude oxygen from the reaction mixture. Solvents for the process include anhydrous, inert solvents described above or an excess of the fluoroorganic halide. The halide used can be a fluoroorganic chloride, bromide or iodide. Preferably the iodide is used. The fluoroorganocopper compound can be isolated as described above.

The organocopper-fluoroorganic exchange process produces, at steady-state, a equilibrium mixture. This equilibrium can be displaced toward producing essentially pure $R_f'''Cu$ by several methods, for example using an organocopper which produces on exchange, a low boiling halide which can be removed by distillation or by using excess $R_f'''X$. By this process, the fluoroorganocopper compound of high purity can be produced.

The fluoroaliphatic compounds of this invention can be prepared by the reaction of a fluoroorganocopper compound with a diazohydrocarbon or a substituted diazohydrocarbon. The fluoroorganocopper compound is prepared according to the procedure described above. The alternative process is conducted at temperatures of −80 to +100° C. Pressure is not critical in the process and atmospheric, subatmospheric and superatmospheric conditions can be used. The process can be conveniently conducted at atmospheric pressure. Preferably, oxygen is excluded from the reaction mixture by an inert gas purge of the reaction vessel during the reaction.

The alternative process is conducted in anhydrous, inert, aprotic solvents. Vigorous, and exothermic, reaction accompanied by the rapid evolution of nitrogen sometimes occurs in the alternative process. Products produced by this process are of high purity and no special procedure is required for elimination of metal contaminants.

By the procedures described above, solutions of fluoroorganocopper compounds can be produced. Fluoroorganocopper compounds in the form of crystalline and amorphous solids are produced from these solutions by super-vacuum distillation under high vacuum. Fluoroorganocopper compounds (I) wherein $y$ is zero can be produced by removal of solvent using the vacuum created by a mercury diffusion vacuum pump ($10^{-6}$ mm. Hg.). Temperatures between −80 to +150° C. facilitate the removal of solvent during the vacuum concentration. Physical characteristics of the product obtained are dependent upon the nature of the fluoroorgano radical of the fluoroorganocopper compound and to the extent to which solvent is removed. In some situations, the presence of a very slight amount of solvent prevents the crystallization of the product and an amorphous solid is produced. The solid products produced readily redissolve in inert, aprotic solvents.

Complexes of fluoroorganocopper compounds can be produced by the reaction of the fluoroorganocopper compounds, either neat or in solution, with the complexing agent. The reaction is conducted at a temperature of 0° to 75° C. Generally, complex formation occurs readily and consists of stirring the reactants at about room temperature. The complex is isolated by vacuum distilling excess solvent and complexing agent from the reaction product.

The starting materials used in the process of this invention are either commercially available or can be produced by standard organic preparative techniques from available starting materials.

Perfluoroalkyl iodides and bromides are prepared by the decarboxylation of the silver salts of perfluoroalkyl-carboxylic acids. R. H. Hazeldine, J. Chem. Soc., 585, (1952); 3490, 4259 (1951).

(Perfluoroalkyl)benzenes are prepared by the reaction of phenylmagnesium halide with a perfluoroalkyl-carboxylic acid and treatment of the resulting perfluoroalkyl phenyl ketone with sulfur tetrafluoride. The procedure can be repeated to introduce more than one perfluoroalkyl group by brominating a (perfluoroalkyl) benzene with bromine and aluminum tribromide to produce a compound which forms an organomagnesium halide which can be reacted with a perfluoroalkanecarboxylic acid. The method is applicable to phenyl, biphenylyl and naphthyl derivatives.

(Perfluoroalkoxy)aryls are formed by the reaction of sulfur tetrafluoride with arylfluoroformates or arylperfluoroalkyl carboxylate.

Mono-, di-, tri and higher fluorinated aryl compounds are prepared by the Balz-Schiemann reaction consisting of the pyrolysis of a diazonium tetrafluoroborate.

Diazo compounds suitable for the process can be prepared by the reaction of N-nitroso compounds with caustic, by the oxidation of hydrazones with mercuric oxide and by the interaction of acyl halides with diazoalkanes. Diazo compounds suitable for this process include diazomethane, 2,2,2-trifluorodiazoethane, and ethyl diazoacetate.

The following compounds can be converted into fluoroorganocopper compounds as described above by reaction with a metal such as magnesium or lithium followed by reaction with a copper-containing compound:

2,3,5,6-tetrafluorobromobenzene
2,4,5-trifluorobromobenzene
3,6-difluorobromobenzene
1,3,4,5,6,7,8-heptafluorobromonaphthalene
4-fluorobromonaphthalene
4-fluoro-4'-bromobiphenyl
2-bromo-5-fluorotoluene
2,3,5,6-tetrakis[trifluoromethyl]bromobenzene
2,4,6-tris[trifluoromethyl]bromobenzene
3,4-bis(trifluoromethyl)bromobenzene
3-(perfluoro-n-hexyl)bromobenzene
3-(heptafluoro-n-propyl)bromobenzene
4-trifluoromethylbenzyl bromide
4-bromophenyl-trifluoromethyl ether
2,3,4,5,6-pentafluorophenylmethyl bromide
tris[trifluoromethyl]vinyl iodide.

The above list of fluoroorganic halides can be reacted with an organocopper compound, including a fluoroorganocopper compound, to produce the corresponding fluoroorganocopper.

The fluoroorganocopper compounds produced above can be reacted with diazo compounds listed above to prepare other fluoroorganocopper compounds.

The fluoroorganocopper compounds of this invention are useful as a source of copper in a process for copper coating various substrates. This process comprises contacting the surface of the substrate to be copper coated with a compound of this invention or a solution thereof in an organic solvent at a temperature of at least 0° C. and preferably at a temperature of 10°—225° C., although higher temperatures are operative.

The process for copper coating the surface of a substrate comprises the steps of cleaning and drying the surface of a substrate, immersing the substrate in a solution of a fluoroorganocopper compound preferably in a solvent such as ethyl ether, dioxane, an ethyl ether/dioxane mixture, or 1,2-dimethoxyethane, (solution process) or coating a substrate with a fluoroorganocopper compound dissolved in a solvent such as dioxane, 1,2-dimethoxyethane, or di(2-methoxyethyl)-ether, and allowing the solvent to evaporate (ink process) and heating, under an inert atmosphere such as nitrogen, helium and the like, to decompose the fluoroorganocopper compound with the deposition of copper metal in the form of a coating. The temperature used in the process is somewhat dependent upon the fluoroorganocopper compound used and whether the "ink" of solution process is used. The "ink" process, in general, requires heating at higher temperatures to decompose the fluoroorganocopper compound. For example, in the table below, when the compound in the left-hand column is used, the preferred minimum temperature for producing a bright copper coating are given in the middle and right-hand column for the "ink" and "solution" process:

| Compound | Preferred Minimum Process Temperature (°C.) | |
| --- | --- | --- |
|  | Solution | Ink |
| m-$CF_3C_6H_4Cu$ | 25 | 150 |
| p-$CF_3C_6H_4Cu$ | 25 | 150 |
| $C_6F_5Cu$ | 175 | 225 |

Various cosolvents for the fluorocopper solutions or inks such as ethers and hydrocarbons affect the rate of decomposition of the fluoroorganocopper compound. Therefore, when these additives are present, the minimum preferred process temperature is of the order —20° C. The preferred maximum temperature is about 350° C. but higher temperatures are also operative. In general, the copper coating produced at higher temperatures is brighter.

The time required to produce the copper coating is dependent upon the fluoroorganocopper compound used, the temperature of the process used and whether cosolvents are present. In general, the time required for the nearly complete decomposition of the fluoroorganocopper compound will vary from a few minutes more or less at high temperatures and hours, days or longer at lower temperatures.

The cosolvents should be inert to the fluoroorganocopper compounds. These cosolvents can be added to the fluoroorganocopper solutions, even in fairly large proportions compared to the reaction solvent, without precipitating the copper compound. These cosolvents include ethers, such as phenyl ether and the dimethyl ether of tetraethylene glycol; hydrocarbons, such as o-terphenyl and triphenylmethane; tertiary amines, such as pyridine, tributylamine and quinoline; and sulfides, such as butyl sulfide and butyl phenyl sulfide.

The concentration of fluoroorganocopper compound in the solution process can affect the nature of the copper film coating produced. In general, bright, reflective, continuous, electrically conducting copper coatings are produced when highly concentrated fluoroorganocopper solutions are used. Preferably the solution should contain about 50 percent, by weight, of the fluoroorganocopper compound, although higher or lower concentrations are operative. The unique high solubility of the fluoroorganocopper compounds is an unexpected beneficial property in the process for copper coating having a better appearance are produced from highly concentrated solutions. In general, the copper coating is bright, reflective, electrically conducting and has a copper color. The thickness of the copper coating depends upon the ratio of fluoroorganocopper compound to the surface area being coated. In the solution process, some of the fluoroorganocopper compound decomposes to give copper powder, therefore, decomposition of the fluoroorganocopper compound to coating is not quantitative. Thicker coatings can be prepared by repeating the coating procedure on a previously coated substrate. In general, the copper coating has a thickness of about 0.1 micron or higher.

The properties of the copper coating can be improved by annealing, by heating the coated substrate at a temperature in the range of 250° to 600° C. in an inert atmosphere such as in nitrogen, helium and the like. Annealing is only practical for coated substrates which are stable and do not melt at these elevated temperatures.

In general, almost any substrate regardless of shape or form can be copper coated using the process taught herein. For example, the substrate can include polymers such as polyethylene, propylene; polyfluoroethylenes such as polytetrafluoroethylenes and poly(vinyl fluoride); polycarboxamides such as polycaprolactam, poly-[hexamethylene]adipamide and the like, poly[ethylene terephthalate]; polyimides such as poly[oxydiphenylenepyromellitimide]; poly(vinyl chloride) and copolymers thereof; poly(oxymethylene) and copolymers thereof; polyacrylonitrile, poly(methyl methacrylate); poly(ethyl acrylate); poly(vinyl acetate) and copolymers thereof; poly(vinyl alcohol); ethylene copolymers such as ethylene/propylene, ethylene/vinyl acetate, and ethylene/vinyl chloride, polystyrene, polybutadiene; polyisobutylene and polycarbonates such as poly(isopropylidene diphenylene carbonate), and other polymers; ceramics such as glass, quartz, and the like; metals such as aluminum, steel, and the like; cellulosics such as paper, cellulose acetates and the like. The form of the substrate can be as a shaped object, film, sheet, fiber and the like. The desirability of copper coating a substrate can be for decorative purpose, to produce a catalytic surface, to form an electrically conducting surface such as in a printed circuit or on a fiber to form a protective coating, and to form a surface amenable for adhesion to other substrates or substances.

The copper coatings produced by the above process are good electrical conductors. The copper-coating process can be used for the production of a solid electrical conductor and in particular for the production of printed electrical circuits. Additionally, the copper-coating process can be used to copper-coat textile fibers prior to the use of the fiber for the manufacture of articles such as cloth or carpeting. Alternatively, the weaved or fabricated article can be copper-coated by the process.

The fluoroorganocopper compounds can contain completely fluorinated or partially fluorinated substituents.

The most preferred compounds of this invention have the following substituents: $R^1$, $R^2$ and $R^3$ are perfluoroalkyl, (perfluoroalkyl)aryl, hydrogen, carbalkoxy or fluoroaryl; $R^4$, $R^5$ and $R^6$ are perfluoroalkyl and Ar is perfluoroalkylaryl, fluoroaryl or (perfluoroalkoxy)aryl.

The process for coating a substrate with copper is conducted preferably with a fluoroorganocopper compound containing at most 10 carbon atoms, exclusive of $B'_y$, when the atomic ratio if F/Cu is 3/1 or higher or at most eight carbons, exclusive of $B'_y$, when the atomic ratio is F/Cu of 2/1 or 1/1. These lower carbon content compounds are preferred because organic by-products formed are more volatile and, thus, more easily removed by evaporation. Less volatile organic by-products can be removed by solvent extraction.

The following examples further illustrate the invention. Dioxane referred to in the examples is 1,4-dioxane. The proton-n.m.r. spectra were obtained at 60 Mc. and the fluorine n.m.r. spectra at 56.4 Mc. in the specified solvent generally at approximately 15 percent, by weight, concentration.

EXAMPLE I

ETHER SOLUTION OF

P-TRIFLUOROMETHYLPHENYLCOPPER

To a nitrogen-swept dry 50 ml. 3-necked round-bottomed flask was added 0.73 g. (30 mmoles) of magnesium turnings and 30 ml. of anhydrous ether. To this mixture was added 6.75 g. (30 mmoles) of p-bromobenzotrifluoride dropwise at a rate to maintain a gentle refluxing. The ethereal solution of p-trifluoromethylphenylmagnesium bromide became dark red-brown and a precipitate appeared. The flask was cooled with an ice-bath and 7.71 g. (30 mmoles) of cuprous iodide 5.11 added with stirring to the reaction mixture to give and orange suspension which changed into a dark copper-colored mixture. No further color change occurred after about 1 hour at which time 20 ml. of ether was added and stirring continued.

The mixture was decomposed by allowing it to stand overnight in contact with air. 4–4'-Bis(trifluoromethyl)-biphenyl, 2.06 g. (47 percent yield) m.p. 68°—92° C. but largely at 88°—92° C. [Markarian J. Am. Chem. Soc., 74, 1858 (1952) reports m.p. 91°–93°C.] was obtained.

EXAMPLE II

ETHER-DIOXANE SOLUTION OF P-TRIFLUOROMETHYLPHENYLCOPPER

To 9.5 g. (9.8 mmoles) of an ethereal solution of p-trifluoromethylphenylmagnesium bromide was added 1.40 g. (9.8 mmoles) of cuprous bromide in a manner similar to Example I. After stirring for 5 hours, the mixture was diluted with 30 ml. of ether and 4.0 ml. of dioxane added giving a very dark perhaps more viscous mixture. The mixture was filtered, under nitrogen, through a glass funnel equipped with a sintered-glass disc of medium porosity. The funnel was rinsed with ether and the filtrates were combined to give an ether-dioxane solution of p-trifluoromethylphenylcopper.

Destruction of the product by allowing it to come into contact with air overnight gave 0.66 g. of a green solid which by analysis contained 29.07% Cu and 1.05 percent magnesium. These results indicated that a 30 percent conversion of p-trifluoromethylphenylmagnesium bromide to p-trifluoro-methylphenylcopper was obtained.

The above preparation was repeated on a 18.4 mmole scale and the ether solution of the p-trifluoromethylphenylcopper was reacted with 10 ml. of benzoyl chloride. From this mixture was isolated 0.53 g. (25 percent) of cuprous chloride containing a small amount of magnesium salts and 1.06 g. (23 percent) of crude p-trifluoromethylbenzophenone, m.p. 109°–116° C.

EXAMPLE III

ETHER-DIOXANE SOLUTION OF M-TRIFLUOROMETHYLPHENYLCOPPER m-Trifluoromethylphenylcopper was prepared by treating about 20 ml. of m-trifluoromethylphenylmagnesium bromide in ether [prepared from 0.49 g. (20 mmoles) of magnesium turnings and 4.50 g. (20 mmoles) of m-bromobenzotrifluoride in 20 ml. of ether] with 2.87 g. (20 mmoles) of cuprous bromide following the procedure of Example I. After stirring 4 hours at 0° C., the mixture was diluted with 60 ml. of ether, treated with 4.00 ml. of dioxane giving a precipitate, and filtered, under nitrogen, through a medium sintered-glass filter, giving an ether-dioxane solution of m-trifluoromethylphenylcopper. Destruction of the ether solution by allowing it to come in contact with air and evaporation of volatile materials present, gave 1.40 g. of a green residue containing some organic material, (37.24% Cu and 0.38% Mg). This analysis indicated a conversion to m-trifluoromethylphenylcopper of 41 percent.

The presence of m-trifluoromethylphenylcopper was confirmed by repeating the above preparation, reacting the product with 10 g. of p-nitrobenzoyl chloride, and isolating 0.94 g. (47 percent) of crude cuprous chloride and 2.64 g. (45 percent) of crude 3-trifluoromethyl-4'-nitrobenzophenone, m.p. 100°–109° C. This crude product was recrystallized from 2B denatured ethyl alcohol and sublimed at 100°–120°C. (0.2 mm. Hg.) giving 3-trifluoromethyl-4'-nitrobenzophenone, m.p. 112.5°–114.0° C.

Anal. Calcd. for $C_{14}H_8F_3NO_3$:
C, 56.94; H, 2.73; F, 19.31; N, 4.75
Found: C, 56.92; H, 2.88; F, 19.34; N, 4.67
C, 57.25; H, 2.91; F, 19.35; N, 4.29 m-Trifluoromethylphenylcopper was prepared in ether, not purified, and decomposed in air to 3,3'-bis(tri-fluoromethyl)biphenyl, $n_D^{25}$ 1.4923 [lit. $n_D^{25}$ 1.4887, Bradsher and Bond, J. Am. Chem. Soc., 71, 2659 (1949)].

The copper compound can be isolated by diluting the ether solution with about 5 volumes of hexane, allowing the mixture to stand for a few minutes, filtering, washing the solids with hexane until the rinse is colorless, and drying under nitrogen.

EXAMPLE IV

PENTAFLUOROPHENYLCOPPER·DIOXANE COMPLEX

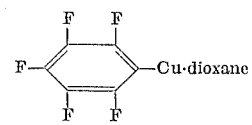

Pentafluorophenylmagnesium bromide was prepared by reacting magnesium turnings (0.49 g., 20 mmoles) in 20 ml. of ether under nitrogen with bromopentafluorobenzene (4.94 g., 20 mmoles). After the reaction was complete, the mixture was cooled to 0° C. and treated with cuprous bromide (5.74 g., 40 mmoles). After stirring 3 hours at 0° C., the mixture was diluted with 60 ml. of ether, and treated with 4.00 ml. of dioxane. The mixture obtained was filtered under nitrogen through a medium sintered-glass filter giving pentafluorophenylcopper in ether. The filter cake was rinsed wit a mixture of 100 ml. ether — 7 ml. dioxane. Evaporation of the first and second filtrates separately under nitrogen streams gave 1.00 g. and 1.50 g. of pentafluorophenylcopper·dioxane, respectively, as large yellow crystals. Destruction of the product from the first and second filtrate in air gave 0.40 g. and 0.73 g. of solid residues, respectively. The analysis of the residue indicated that the pentafluorophenylmagnesium bromide was converted to the organocopper in a combined yield of 44 percent.

A separate preparation of pentafluorophenylcopper·dioxane was analyzed directly.

Anal. Calcd. for $C_6F_5Cu·C_4H_8O_2$:
Cu, 19.92; C, 37.62; H, 2.53; F, 29.60; MW 318.7
Found:
Cu, 21.13; C, 37.61, 38.08, 37.23; H, 2.60, 2.67, 2.41; F, 31.32, 31.58; Mg, 0.23; Br, 0; MW (cryoscopic in benzene) 296, 306.

Pentafluorophenylcopper was prepared in ether and decomposed in air to decafluorobiphenyl, m.p. 66° C. [reported m.p. 68°–69° C., Nield, et al., J. Chem. Soc., (London), 1959, 166].

EXAMPLE V

BIS(PENTAFLUOROPHENYLCOPPER)·DIOXANE COMPLEX

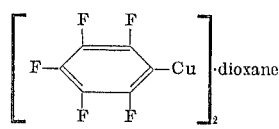

Magnesium turnings (5.40 g., 0.222 mole) and bromopentafluorobenzene (54.9 g., 0.222 mole) in 200 ml. of anhydrous ether under nitrogen were reacted at reflux for 1 hour, cooled with an ice bath, and treated with cuprous bromide (63.1 g., 0.440 mole) giving a moderately exothermic reaction. The mixture was efficiently stirred for one-half hour at room temperature and for one-half hour at reflux, diluted with ether (400 ml.), treated with dioxane (100 ml.) giving a moderately exothermic reaction, stirred for 10 minutes, filtered under nitrogen through a medium sintered-glass filter assembly, and the filter was rinsed with an ether (100 ml.)-dioxane (15 ml.) solution. The filtrate was concentrated under vacuum (finally 10 mm. at 40° C.) and the residue heated to 90° C. and swept with nitrogen giving 35.0 g. (57 percent) light brown powder, bis(pentafluorophenylcopper)·dioxane. The $F^{19}$ NMR spectrum (56.4 Mc) of a saturated ether solution showed three peaks (positions relative to externally substituted $CCl_3F$) at 5974 (2F, further split doublet), 8430 (1F, triplet), and 9092 c.p.s. (2F, further split triplet). The product was slightly soluble in dioxane, moderately soluble in ether and very soluble in tetrahydrofuran.

Anal. Calcd. for $(C_6F_5Cu)_2·C_4H_8O_2$:
C, 34.94; H, 1.47; Cu, 23.14; F, 34.6
Found:
C, 34.77; H, 1.57; Cu, 23.60; F, 35.09; Mg, 0.37

EXAMPLE VI

TETRAKIS [PENTAFLUOROPENTAFLUOROPHENYLCOPPER DIOXANE COMPLEX

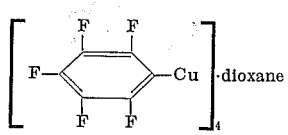

Bis(pentafluorophenylcopper)·dioxane (5.02 g.) was heated under high vacuum (about 0.01 μ at the pump) at 60°C. for 2 hours. There was obtained 0.21 g. dioxane in a trap cooled by liquid nitrogen and 4.53 g. of residue which was shown to contain dioxane.

Anal. Calcd. for $(C_6F_5Cu)_4·C_4H_8O_2$:
C, 33.20; H, 0.80; F, 37.60; Cu, 25.15
Found:
C, 33.32; H, 1.17; F, 36.65; Cu, 25.35   33.59 1.21
36.49

EXAMPLE VII

PENTAFLUOROPHENYLCOPPER

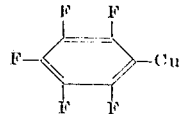

$(C_6F_5Cu)_4$·dioxane (3.25 g.) was heated under high vacuum (about 0.01 μ at the pump) at 130° C. for 5 ½ hours. There was obtained 0.2 g. of dioxane in a trap cooled by liquid nitrogen and 2.86 g. of solid characterized as pentafluorophenylcopper by $F^{19}$ NMR absorption (THF) at 6044 (2F, multiplet), 8651 (1F, triplet), and 9153 c.p.s. upfield of externally substituted $CCl_3F$ (2F multiplet).

Anal. Calcd. for $C_6F_5Cu$:
C, 31.25; F, 41.20; Cu, 27.55
Found: C, 31.31; F, 40.79; Cu 27.82; H, 0.61
31.32   40.77   0.52

EXAMPLE VIII

ETHER-DIOXANE SOLUTION OF P-FLUOROPHENYLCOPPER

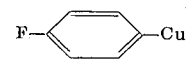

To an ether solution of p-fluorophenylmagnesium bromide (20 ml., 21.2 mmoles) at 0° C. under nitrogen was added cuprous bromide (5.74 g., 40.0 mmoles). After stirring 4 hours at 0°C., the mixture was diluted with ether (60 ml.), stirred 10 minutes at 0° C. and treated with 4.00 ml. of dioxane. The mixture was filtered under nitrogen through a medium sintered-glass filter and the filter was rinsed with a solution of ether (100 ml.)-dioxane (7 ml.) into a separate flask. The first filtrate was concentrated under vacuum, finally at room temperature/0.5 mm., leaving p-fluorophenylcopper, as a dark residue, which was redissolved in ether (50 ml.). The solutions were decomposed in air giving 0.41 g. and 0.50 g. of solid residues. The analyses (Cu:Mg atom ratio of 65:1) of the residues indicated that the p-fluorophenylmagnesium bromide was converted to organocopper in a combined yield of 40 percent.

The $F^{19}$ NMR spectrum of an ether-dioxane solution of p-fluorophenylcopper comprised a multiplet centered at −676 c.p.s., 1,4-difluorobenzene used as an internal standard.

p-Fluorophenylcopper was prepared in ether and decomposed in air without purification to 4,4'-difluorobiphenyl, m.p. 83°—85° C., [reported, m.p. 94°—95°C., Bergmann, et al., J. Am. Chem. Soc., 78, 6037 (1956)].

EXAMPLE IX

ETHER-DIOXANE SOLUTION OF M-FLUOROPHENYLCOPPER

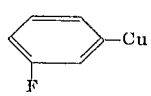

m-Fluorophenylmagnesium bromide was prepared by reacting magnesium turnings (0.49 g., 20 mmoles) and m-bromofluorobenzene (3.50 g., 20.0 mmoles) in anhydrous ether (20 ml.) under nitrogen near reflux temperature for 1 hour. After cooling with an ice bath the reaction mixture was treated with cuprous bromide (4.94 g., 34.4 mmoles). After stirring for 2 ½ hours at 0° C., the mixture was diluted with ether (60 ml.), stirred 1 hour at 0° C., treated with 4.00 ml. of dioxane and filtered through an ice-cooled, medium-sintered-glass filter assembly. The dark filtrate was concentrated under a nitrogen stream leaving m-fluorophenylcopper as a dark, glassy solid which was decomposed in air, giving 0.55 g. solid decomposition products. The analysis of the residue indicated that a conversion to organocopper of 18 percent was obtained.

While still under nitrogen, the filter was rinsed with a mixture of 200 ml. of ether and 28 ml. of dioxane and this filtrate was decomposed in air overnight, giving 0.53 g. of dark solid which by analysis represented an additional 16 percent yield of the organocopper.

The $F^{19}$ NMR spectrum of the ether-dioxane solution comprised a multiplet at −376 c.p.s.; from 1,4-difluorobenzene.

EXAMPLE X

BIS(PERFLUORO-T-BUTYLCOPPER)·TRIS(DIOXANE)

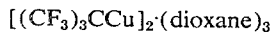

To an ice-bath-cooled solution of m-trifluoromethylphenylcopper (8 ± 1 mmoles) in 60 ml. of ether-dioxane under nitrogen was added about 12 ml. of an ether solution containing $(CF_3)_3CBr$ (12 mmoles). A colorless precipitate formed. After stirring for 2 hours at 0° C., the pale yellow solution was transferred by syringe to another flask and concentrated at reduced pressure giving 60 ml., b.p. 25° C./10 mm., one-half ml., b.p. 60° C./0.2 mm., and a yellow semicrystalline residue $[(CF_3)_3CCu]_2·(dioxane)_3$ in 61 percent yield. The distillate was shown to contain by gas chromatographic analysis, ether, large amounts of m-bromobenzotrifluoride and dioxane, a little benzotrifluoride, and no m-fluorobenzotrifluoride.

Addition of water to a small part of the residue gave vigorous gas evolution with the formation of an orange solid. The entire residue was covered with ether (20 ml.), stirred with water (3 ml.), and the ether decanted from the wet precipitate. The orange powder (0.36 g.) obtained after drying overnight was shown to be cuprous oxide (61 percent yield).

Anal. Calcd. for $Cu_2O$: Cu, 88.82
Found: Cu, 86.21

Gas chromatographic analysis of the ether solution from the hydrolysis showed that it contained a component more volatile than ether, viz. $(CF_3)_3CH$ and 5.0 mmoles of dioxane but no benzotrifluoride was present. The formation of $(CF_3)_3CH$ was confirmed by comparison with the nuclear magnetic resonance spectrum of the product with that of an authentic sample.

An ether-dioxane solution of $(CF_3)_3CCu$ at room temperature was stable for at least 1 day. The $F^{19}$ NMR spectrum (ether-dioxane) or $[(CF_3)_3CCu]_2·(dioxane)_3$ was a sharp singlet at 3,076 c.p.s. upfield from externally substituted $CCl_3F$ standard.

Anal. Calcd. for $(C_4F_9Cu)_2·(C_4H_8O_2)_3$:
 C, 28.96; H, 2.92; F, 41.23; Cu, 15.32
Found: C, 28.90; H, 2.96; F, 41.51; Cu, 16.73; Br, 1.63

EXAMPLE XI

ETHER-DIOXANE SOLUTION OF 2,5-DIFLUOROPHENYLCOPPER

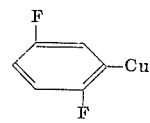

To magnesium turnings (0.49 g., 20 mmoles) and 20 ml. of ether under nitrogen was added 2-bromo-1,4-difluorobenzene (3.86 g., 20 mmoles). After 1 hour, the mixture was cooled with an ice bath and treated with 3.44 g. (24 mmoles) of cuprous bromide. After stirring 1 ½ hours, the mixture was diluted with 60 ml. of ether, stirred 20 minutes, treated with 10 ml. of dioxane giving a precipitate, stirred 15 minutes, and filtered through an ice-cooled medium sintered-glass filter giving a light brown solution of 2,5-difluorophenylcopper. On hydrolysis with water, the product gave 1,4-difluorobenzene and a solid which was largely cuprous oxide (Cu:Mg atom ratio 154:1).

Anal. Calcd. for $Cu_2O$: Cu, 88.82
Found: Cu, 81.05; Mg, 0.20

EXAMPLE XII

2-Nonafluorobiphenylylcopper

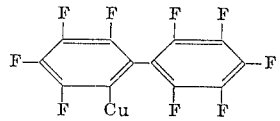

Bromopentafluorobenzene (98.8 g., 0.400 mole) was added to magnesium turnings (9.72 g., 0.400 mole) in 400 ml. of ether under $N_2$ as fast as the reaction would permit. After 1 hour, the mixture was treated with cuprous bromide (63.1 g., 0.440 mole), heated at reflux for 1 hour, diluted with 300 ml. of ether, treated over a one-half hour period with 150 ml. of dioxane, let stand for 1 hour, filtered, rinsed with 400 ml. ether-50 ml. of dioxane, and concentrated, finally at 70° C. (6 mm.) to give 36.25 g. of solid. The $F^{19}$ NMR spectrum of the product in tetrahydrofuran (THF) showed very weak absorption characteristic of pentafluorophenylcopper and general broad absorption due to 2-nonafluorobiphenylylcopper.

Anal. Calcd. for $C_6F_5Cu$: C, 31.25; F, 41.20; Cu, 27.55
 $C_{12}F_9Cu$: C, 38.1; F, 45.2; Cu, 16.7
Found: C, 36.78; H, 1,52; F, 37.13;
 Cu, 20.04; Mg, 0.36

To 19.70 g. of the product was added 25 ml. of water and 25 ml. of ether. After a few hours, the mixture was filtered giving 4.64 g. of orange solid which was principally cuprous oxide.

Anal. Calcd. for $Cu_2O$: Cu, 88.82
Found: Cu, 81.84

The ether layer was distilled giving 6.47 g. forerun, b.p. 40° C. (760 mm.) to 20° C. (10 mm.), and 4.30 g.

of 2H-nonafluorobiphenyl as a low melting solid, b.p. 90°–100° C. (10 mm.). Over-all yield was 12.5 percent. Analytical sample was obtained by two crystallizations from n-hexane at −55° C., m.p. 45.0°–45.7° C. [lit. m.p. 42°–43°C.].

EXAMPLE XIII

ETHER SOLUTION OF (M-TRIFLUOROMETHYLPHENYL)CARBETHOXYMETHYLCOPPER

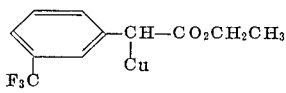

To an ice-cooled solution of m-trifluoromethylphenylcopper (8±1 mmoles) in ether-dioxane (60 ml.) under nitrogen was added dropwise ethyl diazoacetate (2.28 g., 89 percent, 17.8 mmoles) in ether (20 ml.). Gas was evolved during the addition which requires about 10 minutes and for 20 minutes afterwards. After one-half hour at 0° C. and 1 ½ hours at room temperature, a dark solution of (m-trifluoromethylphenyl)carbethoxymethylcopper was obtained. The product was characterized by decomposing it by stirring one-half hour with water (2 ml.), filtering, rinsing with ether, and the solid air-dried giving 0.59 g. of a dark coppercontaining solid corresponding to a recovery of 7.2 mmoles of copper.

Anal. Calcd. for $Cu_2O$: Cu, 88.82
Found: Cu, 77,43; N, 0.86

Concentration of the ether solution gave 1.71 g. of oily product which was shown by gas chromatography and NMR spectroscopy to contain ethyl m-trifluoromethylphenylacetate as the most abundant component. Its identity was confirmed by alkaline hydrolysis to m-trifluoromethylphenylacetic acid, m.p. 74°–77 C., [lit. m.p. 72°–73° C.].

EXAMPLE XIV

(PENTAFLUOROPHENYL)CARBE THOXYMETHYLCOPPER

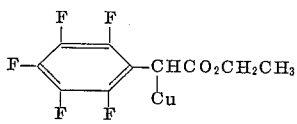

To an ice-bath-cooled solution of 3.74 g. (13.6 mmoles) bis(pentafluorophenylcopper)·dioxane in 20 ml. of tetrahydrofuran (THF) under nitrogen was added 5 ml. of an ether solution containing 1.92 g. (15.0 mmoles) of ethyl diazoacetate. The addition of ethyl diazoacetate was followed immediately by considerable foaming and a surge of gas through a mineral oil exit bubbler. A dark brown solution of (pentafluorophenyl)carbethoxymethylcopper was obtained.

This solution was stirred for 2 hours with 1 ml. of water. Filtration and concentration by distillation gave 2.47 g. of a green oil which was distilled in a molecular still to give 0.64 g., b.p. 90° C. (0.85 mm.) and 1.14 g., b.p. 150° C. (0.08 mm.). The main component of the first fraction, 92 percent (77 percent of the second), was identified as ethyl (pentafluorophenyl)acetate.

EXAMPLE XV

ETHER SOLUTION OF 4-(TRIFLUOROMETHOXY)PHENYLCOPPER

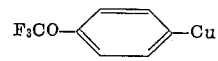

To magnesium turnings (0.54 g., 22 mmoles) and 20 ml. of ether under nitrogen was added 1-bromo-4-(trifluoromethoxy)benzene (4.82 g., 20.0 mmoles). After 1 hour, the mixture was cooled with an ice bath and treated with cuprous bromide (5.31 g., 44 mmoles). After 2 hours at 0° C., the mixture was diluted with 70 ml. of ether, stirred 5 minutes, treated over a one-half hour period with 7.5 ml. of dioxane, and filtered through an ice-cooled medium sintered-glass filter to give a solution of 4-(trifluoromethoxy)phenylcopper in 32 percent yield. Removal of solvent at 25° C. (0.1 mm.) gave 1.74 g. of solid which was largely 4-(trifluoromethoxy)phenylcopper.

Anal. Calcd. for $C_7H_4F_3OCu$:
C, 37.42; H, 1.79; F, 25.37; Cu, 28.29; Weight Ratio of Cu/F, 1.115
Found: C, 36.73, 36.28, 36.48; H, 2.48, 2.47, 2.34; F, 21.62; Cu, 23.65; Mg, 0.77; Br, 6.34; Weight ratio of Cu/F, 1.093 Examples of utility:

EXAMPLE XVI

Into separate flasks were placed 10 ml. portions of a solution containing approximately 2.3 mmoles of m-trifluoromethylphenylcopper in ether-dioxane and one of the following additives: 0.3 g. of 1-hexene, 0.6 g. of 1,1-diphenylethylene, and 50 ml. of petroleum ether, respectively. The flasks containing the above mixtures were allowed to stand at room temperatures. After 1 day, reflective copper coatings were formed on the inner surface of the flasks. The copper coating was scraped from the surface and collected by filtration, rinsed with ether, and analyzed.

The results obtained were:

| Additive | Yield of solid | Anal. % Cu |
|---|---|---|
| hexene | 0.09 g. | 89.23% |
| 1,1-diphenyl-ethylene | 0.12 g. | 75.97% |
| petroleum ether | 0.07 g. | 76.17% |

EXAMPLE XVII

To a solution of 0.4 g. of m-trifluoromethylphenylcopper(I) in ether-dioxane, prepared as in Example I, was added 0.28 g. of phenyl ether. The solution was concentrated under a stream of nitrogen at room temperature until the amount of solvent remaining in addition to the phenyl ether was about 0.1 g. Part of the concentrated solution was applied to the inner bottom of a glass vessel in an atmosphere of nitrogen. A stream of nitrogen was passed through the vessel for 5 minutes at 65° C., after which the vessel was closed and heated in an oil bath at 175° C. for 9 minutes. Heating at 175° C. was continued for 6 minutes while a stream of nitrogen was passed through the system, and the vessel was cooled. A smooth copper mirror had formed on the glass surface. The side of the coating in contact with the glass was brighter than the side away from the glass. The electrical resistance of the copper coating, determined with a Simpson Model 260 meter by scratching the coating with two point probes 8 mm. apart, was 0.7 ohm.

The experiments summarized in Table I in which "-glass" was the substrate were carried out by essentially the foregoing procedure, with variations as noted. When the substrate was other than glass, a piece of the substrate was placed on the bottom of the vessel. The solution of m-trifluoromethylphenylcopper(I) was applied to it (and also, incidentally, to some of the glass surface), excess solution was removed from the substrate with a pipette or syringe, and the remainder of the treatment was carried out as described above, with variations as noted in Table I.

EXAMPLE XXXI

A solution of m-trifluoromethylphenylcopper in fluorotrichloromethane was placed in a glass vessel and allowed to stand at room temperature. Within 30 minutes, a reflective copper coating, e.g., a copper mirror, was deposited on the inner surface of the vessel.

EXAMPLE XXXII

An ether-dioxane solution concentrate of m-fluorophenylcopper in a glass vessel, made from m-fluorophenylmagnesium bromide and cuprous bromide by essentially the method of Example IX, deposited a copper mirror coating on the inner surface of the glass vessel over a period of three days at room temperature.

EXAMPLE XXXIII

An ether-dioxane solution of p-fluorophenylcopper, made from p-fluorophenylmagnesium bromide and cuprous bromide by essentially the method of Example VIII, was placed in a glass vessel and allowed to stand at room temperature over a period of three days. A copper mirror coating was deposited on the inner surface of the glass vessel.

EXAMPLE XXXIV

A 5.0-g. sample of finish-free acrylonitrile/methyl acrylate/sodium p-styrenesulfonate (93.8/6/0.2) copolymer staple, 1 ½ inch cut length, was placed in a 200-ml. flask, dried under a vacuum of 0.1 mm. for 2 hr., placed under 1 atmosphere of pure nitrogen, covered with 100 ml. of ether and 100 ml. of an ether-dioxane solution containing about 40 mmoles of m-trifluoromethylphenylcopper, and stored for 4 days at room temperature. The mixture was suction filtered. The coated staple was liberally rinsed with ether and air-dried giving 7.5 g. of bright, light coppery-colored material.

The electrical resistance of the bulk material between two point probes separated by 8 mm. was less than 0.2 ohms. Color photographs at 120X showed a smooth copper coating. Electron microscope pictures of fiber cross sections showed a 0.20 to 0.25 micron coating that closely follows the irregular contour of the fiber with occasional gaps.

The coated fiber was blended with uncoated fiber, woven into fabric, and tested for antistatic behavior before and after washing. A fabric containing 1 percent of coated fiber analyzed for 0.25 and 0.21 percent copper and had moderate antistatic protection. After 10 washings, it analyzed for 0.22 and 0.21 percent copper and still had moderate antistatic protection.

EXAMPLE XXXV

Substrates described below were immersed in 1220 ml. of about 60:1 ether-dioxane solution containing approximately 0.18 mole of m-trifluoromethylphenylcopper. The mixture was allowed to stand for 5 days at room temperature, then the solution was decanted and the substrates rinsed with ether and air-dried. The substrates were coated with conductive layers of copper. Loose pieces of copper were collected and analyzed to be 96.04 percent copper.

The copper coating on a piece of molded polyhexaethyleneadipamide was removed with an air jet. The coating on a piece of molded, acid-etched polyhexamethyleneadipamide was not removed by an air jet and had a resistance of 10 to 15 ohms between point probes 8 mm. apart.

The coating on a tablet of molded, acid-etched polyformaldehyde (20 percent glass filled) was not removed by an air jet and conducted very well near the bottom end. The coating on a tablet of molded polyformaldehyde was largely removed by an air jet. The coatings on ⅛ × 1 ½ × 2 ½ inch pieces of molded, acid-etched polyformaldehyde were not removed by an air jet and conducted fairly well.

The coating on alumina wafers was not removed by an air jet and was an excellent electric conductor.

The compounds of this invention are useful for the preparation of finely divided copper powder by heating solutions of a fluoroorganocopper compound in the absence of oxygen. In 1965, about 31,200 tons of copper powder was produced and used as catalysts and for fabrication of large copper and copper alloy components by powder metallurgical techniques. Chemical Week, McGraw-Hill Publication, New York, Vol 98, Mar. 19, 1966, page 59.

The aromatic organocopper compounds are useful for the preparation of biphenyl and quaterphenyl compounds which are scintillating agents.

The compounds of this invention are useful for the production of fluorine-containing intermediates especially symmetrical compounds produced by coupling reactions of fluoroorganocopper compounds.

The embodiments of the invention in which an exclusive property or privilege is claimed are defined as follows:

1. A fluoroorganocopper compound and complexes thereof having an atomic ratio of fluorine to copper of at least 1:1 of the formula $(R_f-Cu)_x \cdot B'_y$ wherein $R_f$ is a fluorinated monovalent hydrocarbyl radical containing up to 12 carbons selected from the group consisting of

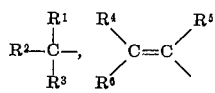

and Ar—, wherein:

$R^1$, $R^2$ and $R^3$ are selected from the group consisting of perfluoroalkyl, (perfluoroalkyl)aryl, hydrogen, carbalkoxy and fluoroaryl;

$R^4$, $R^5$ and $R^6$ are perfluoroalkyl; Ar is selected from the group consisting of perfluoroalkylaryl, fluoroaryl and (perfluoroalkoxy)aryl;

B' is 1,4-dioxane; $x$ is an integer from 1–4, and $y$ is 0, ½, 1, 2 or 3.

2. Fluoroorganocopper compounds and complexes of claim 1 of the formula

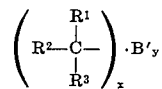

wherein $R^1$, $R^2$, $R^3$, B', $x$ and $y$ are as defined in claim 1.

3. Fluoroorganocopper compounds and complexes of claim 1 of the formula

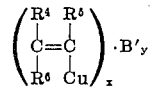

wherein $R^4$, $R^5$, $R^6$, B', $x$ and $y$ are as defined in claim 1.

4. Fluoroorganocopper compounds and complexes of claim 1 of the formula $(Ar-Cu)_x \cdot B'_y$ wherein Ar, $x$, $y$ and B' are as defined in claim 1.

5. The compound of claim 1 wherein $R_f$ is pentafluorophenyl and $x$ is 1 and $y$ is 0, said compound being pentafluorophenylcopper.

6. The complex of claim 1 wherein $R_f$ is pentafluorophenyl, $x$ is 1, $y$ is 1.

7. The complex of claim 1 wherein $R_f$ is perfluoro-t-butyl, $x$ is 2, $y$ is 3 and B' is 1,4-dioxane; said compound being bis(perfluoro-t-butylcopper)tris(1,4-dioxane).

8. A solution of the compounds and complexes of claim 1 in an inert, aprotic, organic solvent.

* * * * *

UNITED STATES PATENT OFFICE
CERTIFICATE OF CORRECTION

Patent No. 3,700,693   Dated October 24, 1972

Inventor(s) Allan Cairncross et al.

It is certified that error appears in the above-identified patent and that said Letters Patent are hereby corrected as shown below:

Column 17, after line 30, insert TABLE I, as shown on the attached sheet.

Signed and sealed this 28th day of January 1975.

(SEAL)
Attest:

McCOY M. GIBSON JR.
Attesting Officer

C. MARSHALL DANN
Commissioner of Patents

TABLE I

Preparation of Copper Films from meta-Trifluoromethylphenylcopper

| Example | Substrate | Coating Solution m-CF₃C₆H₄Cu | Ether Dioxane | Other | Predrying Time and Temp. | Baking Time and Temp. | Postdrying Time and Temp. | Resistance | Remarks on Coating |
|---|---|---|---|---|---|---|---|---|---|
| XVIII | glass | 0.4 g. | 0.5 | tetraglyme 0.50 g. | 10 min./25-75 °C. | 6 min./175 °C. | 5 min./175 °C. | 2.2 | Dull coppery solid. Few cracks or holes. |
| XIX | glass | 0.4 g. | 0.4 g. | O-terphenyl 0.25 g. | 10 min./25-75 °C. | 12 min./175 °C. | — | 170 thin 3000 thick | Dark, metallic, smooth, shiny residue. |
| XX | Mylar® [1] | 1.6 g. | 0.7 g. | C₆H₅OC₆H₅ 1.00 g. | 5 min./25 °C. | 15 min./175 °C. | — | 8 | Largely dark, cracked, porous. Small section was bright, rough coppery. |
| XXI | glass | 0.4 g. | — | pyridine 0.16 g. | — | 5 min./175 °C. | — | 4 | Light-colored copper deposits. |
| XXII | Mylar® [1] | Yes | Yes | — | Yes | 10 min./175 °C. | — | conducts | Coating did not rub off, did not tear off with adhesive tape. |
| XXIII | Teflon® FEP film [2] (2 mil.) | Yes | Yes | — | Yes | 10 min./175 °C. | — | conducts | — |
| XXIV | fiber glass thread | Yes | Yes | — | Yes | 10 min./175 °C. | — | conducts | — |
| XXV | nylon [3] thread | Yes | Yes | — | Yes | 10 min./175 °C. | — | barely conducts | — |
| XXVI | Delrin® [4] pressed film | Yes | Yes | — | — | 10 min./180 °C. | Yes | conducts | Adhered well. |
| XXVII | nylon [3] film | Yes | Yes | — | — | 10 min./180 °C. | Yes | conducts | Adhered well. |
| XXVIII | aluminum foil | Yes | Yes | — | — | 10 min./180 °C. | Yes | conducts | Adhered well to half of the foil. |
| XXIX | paper | Yes | Yes | — | — | 10 min./180 °C. | Yes | conducts | Coated twice. |
| XXX | polyimide [5] | Yes | Yes | — | — | 10 min./180 °C. | Yes | — | Light color, shiny. |

[1] Polyethylene terephthalate).
[2] Tetrafluoroethylene/hexafluoromethylene copolymer.
[3] Poly(hexamethyleneadipamide).
[4] Poly(oxymethylene).
[5] Poly(4,4'-oxydiphenylenepyromellitimide).